United States Patent [19]
Brown, Jr.

[11] Patent Number: 4,796,958
[45] Date of Patent: Jan. 10, 1989

[54] INTEGRATED ANTI-LOCK BRAKING SYSTEM

[75] Inventor: Arthur K. Brown, Jr., South Bend, Ind.

[73] Assignee: Allied Signal Inc., Morristown, N.J.

[21] Appl. No.: 89,459

[22] Filed: Aug. 26, 1987

[51] Int. Cl.$^4$ ............................................. B60T 8/06
[52] U.S. Cl. .................................... 303/113; 60/581; 303/50; 303/115
[58] Field of Search ................. 303/113, 115, 119, 50; 60/581, 545, 565, 591, 560, 413, 547.1, 548

[56] References Cited

U.S. PATENT DOCUMENTS

| | | | |
|---|---|---|---|
| Re. 30,177 | 12/1979 | Morse et al. | 303/113 |
| 3,910,643 | 10/1975 | Kobashi et al. | 303/114 |
| 4,255,931 | 3/1981 | Leiber et al. | 60/581 |
| 4,444,440 | 3/1984 | Farr | 303/50 |
| 4,634,190 | 1/1987 | Wupper | 303/115 X |

OTHER PUBLICATIONS

SAE, *The First Compact 4-Wheel Anti-Skid System with Integral Hydraulic Booster*, Bleckman, 830483, Feb. 2–Mar. 3, 1983.

SAE, *Pressure Modulator in Separate and Integrated Anti-Skid Systems with Regard to Safety*, Jonner, 840467, Feb. 27–Mar. 2, 1984.

Primary Examiner—Andres Kashnikow
Assistant Examiner—Matthew C. Graham
Attorney, Agent, or Firm—Ken C. Decker; William N. Antonis

[57] ABSTRACT

An integrated anti-lock braking system includes a master cylinder, a modulator valve assembly, an electric motor pump, a brake proportioning valve, and a differential pressure valve all integrated into a common assembly. Primary and secondary fluid passages defined within the housing are provided to communicate the various devices included within the assembly. The assembly includes a bracket engaging portion upon which a mounting bracket is provided to attach the assembly to the vehicle and which is capable of mounting the assembly to accommodate mounting at selected angles.

15 Claims, 6 Drawing Sheets

INTEGRATED ANTI-LOCK BRAKING SYSTEM

BACKGROUND OF THE INVENTION

The present invention relates to anti-lock braking systems and in particular to a compact anti-lock braking system hydraulic assembly in which a master cylinder, hydraulic booster, modulating valves, accumulator and associated hydraulic hardware are provided in an integrated package which significantly reduces hydraulic connections and reduces manufacturing cost.

Anti-lock braking systems are now well known. Broadly, these systems incorporate an electronic circuit including a microprocessor based computational circuit connected to the wheels of a motor vehicle via one or more wheel speed sensors. The rotational behavior of the wheels, particularly during braking, is analyzed through the medium of appropriate algorithms to sense an imminent wheel lock or skid condition. When such a condition is sensed, the anti-lock braking system automatically assumes control of the vehicle braking to modulate the application of braking forces to effect maximum vehicle braking and prevent locking of the wheels. In the practical implementation of such systems, a significant number of elements must be incorporated. For example, the system must include a dual circuit master cylinder, means for providing a power assist to the master cylinder such as a hydraulic booster or a vacuum booster, a plurality of high speed solenoid actuated valves, pressure and differential pressure switches, proportioning valves, and the like. Because of the limited space available in contemporary engine compartments and the necessity of minimizing hydraulic line length and connections and the need to provide a system that can be conveniently mounted in a variety of vehicles, it is necessary to provide a compact, low cost, and efficient integrated system incorporating all of the required components. Such integrated systems are, for example, described in SAE Technical Papers Nos. 830483 entitled "The First Compact Four-Wheel Anti-Skid System with Integral Hydraulic Booster", by H. W. Bleckmann, et al, dated Feb. 28-Mar. 4, 1983 and No. 840467 entitled "Pressure Modulation in Separate and Integrated Anti-Skid Systems with Regard to Safety", by W. D. Jonner, et al, dated Feb. 27-Mar. 2, 1984. These prior art integrated systems have, however, continued to be relatively complex and there continues to exist a need for a more compact, efficient, and cost-effective integrated anti-lock braking system assembly.

Broadly, the present invention is an integrated, anti-lock braking system hydraulic assembly. The assembly includes a main body having an elonged cylindrical bore therethrough in which are operatively situated a conventional dual circuit master cylinder and hydraulic booster. A plurality of fluid passages are formed in the body in parallel relationship with the bore in symmetrical arrays. A first plurality of modulating valve receptacles are formed in the body adjacent one end thereof. A plurality of chambers are formed in the body distal the receptacles, and the receptacles and the chambers are provided with fluid passages communicating with predetermined ones of the first fluid passages. A system of modulating valves are received in the receptacles, and differential pressure valves and proportioning valves are disposed in the chambers.

In one embodiment of the invention, the receptacle end of the body is provided with a bracket engaging portion slidably engagable with a bracket, the latter being of variable geometry to accommodate mounting of the assembly to variously configured firewalls. A pressure switch receiving receptacle may further be provided in the receptacle portion of the body.

Means are provided for mounting a fluid accumulator, a fluid pump, pressure relief valve, and a fluid reservoir. The assembly is substantially symmetrical, requires a minimum of external hydraulic connections, and occupies a space equal to or smaller than a conventional vacuum boosted master cylinder assembly.

It is therefore an object of the invention to provide a compact integrated hydraulic assembly for an anti-lock braking system.

It is another object of the invention to provide such an assembly which is substantially symmetrical and occupies the space of a conventional vacuum boosted master cylinder.

Still another object of the invention is to provide such an assembly which provides a major portion of hydraulic connections between the components of an anti-lock braking system within a single body.

Another object of the invention is to provide such an assembly which includes means for mounting same that will accommodate mounting to variously configured firewalls.

Yet another object of the invention is to provide such an assembly which can be manufactured using straightforward manufacturing techniques at a minimum cost and which is adaptable to anti-lock braking systems of various configurations.

BRIEF DESCRIPTION OF THE DRAWINGS

The above objects and purposes of the invention and the invention itself will be best understood in light of the following detailed description thereof taken in conjunction with the appended drawings wherein.

DESCRIPTION OF THE PREFERRED EMBODIMENT

Figure 1:
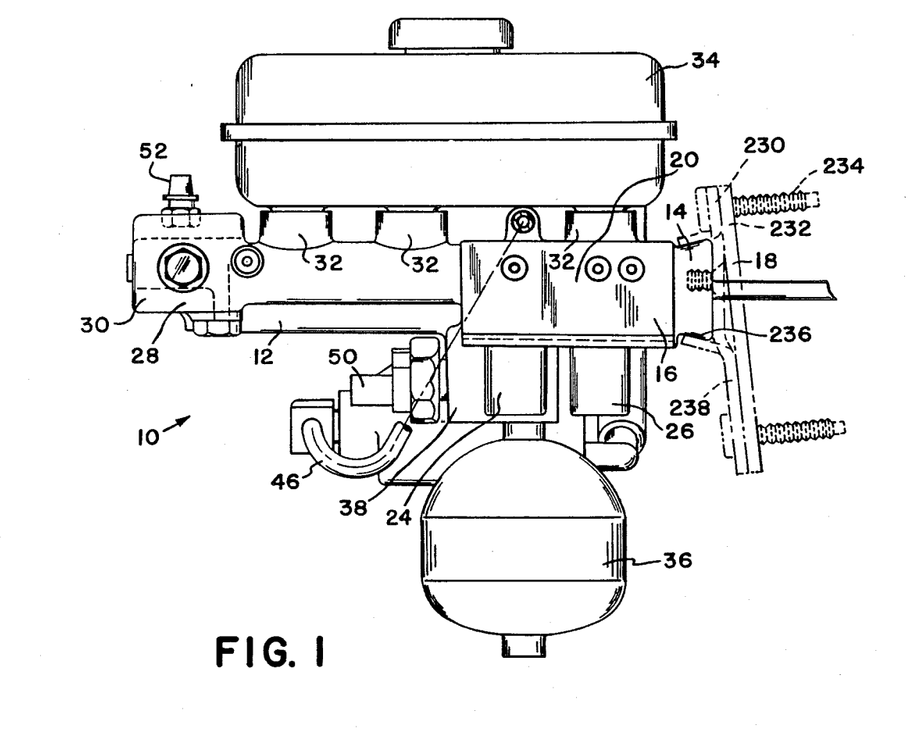
FIG. 1 is a side plan view of an integrated hydraulic assembly for an anti-lock braking system in accordance with the invention.
Figure 2:
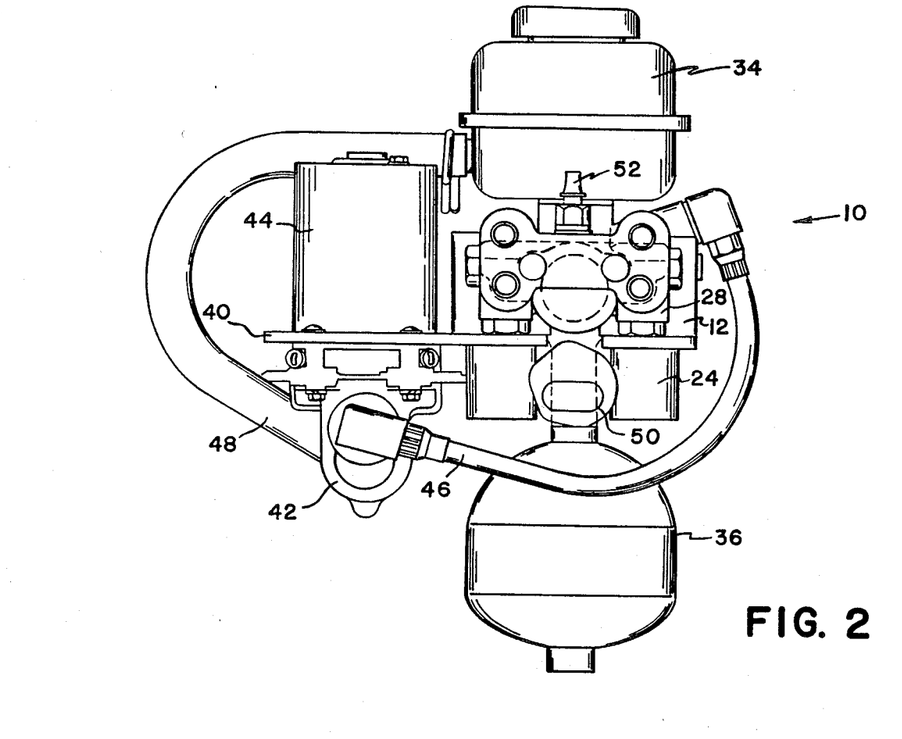
FIG. 2 is an end plan view of the integrated assembly of FIG. 1.

Referring first to FIGS. 1 and 2, there is shown an integrated hydraulic assembly for an anti-lock braking system indicated generally at 10. The assembly comprises an elonged body 12 having a reentrantly tapered boss 14 at its mounting end 16 which slidably engages a universal mounting bracket 18. Body 12 further includes an enlarged receptacle portion 20 which receives a plurality of solenoid actuated valves 24, 26 which effect automatic modulation of braking pressure during anti-lock operation.

The distal end 28 of the body 12 includes an enlarged chamber portion 30 which receives a differential pressure switch and proportioning valves in accordance with system requirements. The top (as viewed in the drawings) of the body 12 is provided with a plurality of bosses 32 which receive a fluid reservoir 34. An accumulator 36 is fixedly secured to a lower body portion 38.

As can best be seen in FIG. 2, a laterally extending mounting plate 40 is fixedly secured to the receptacle portion 16 to which a pump 42 with associated pressure relief valve (not shown in FIGS. 1 and 2) and motor 44 are mounted. Pressurized fluid supply line 46 extends between the pump housing 42 and body 12 and a fluid return line 48 extends therebetween back to the reservoir 34. Appropriate electrical connections and switches, described in detail below, are provided at 50 and 52 to provide indications of pump/accumulator operating pressure and differential pressure.

Figure 3:
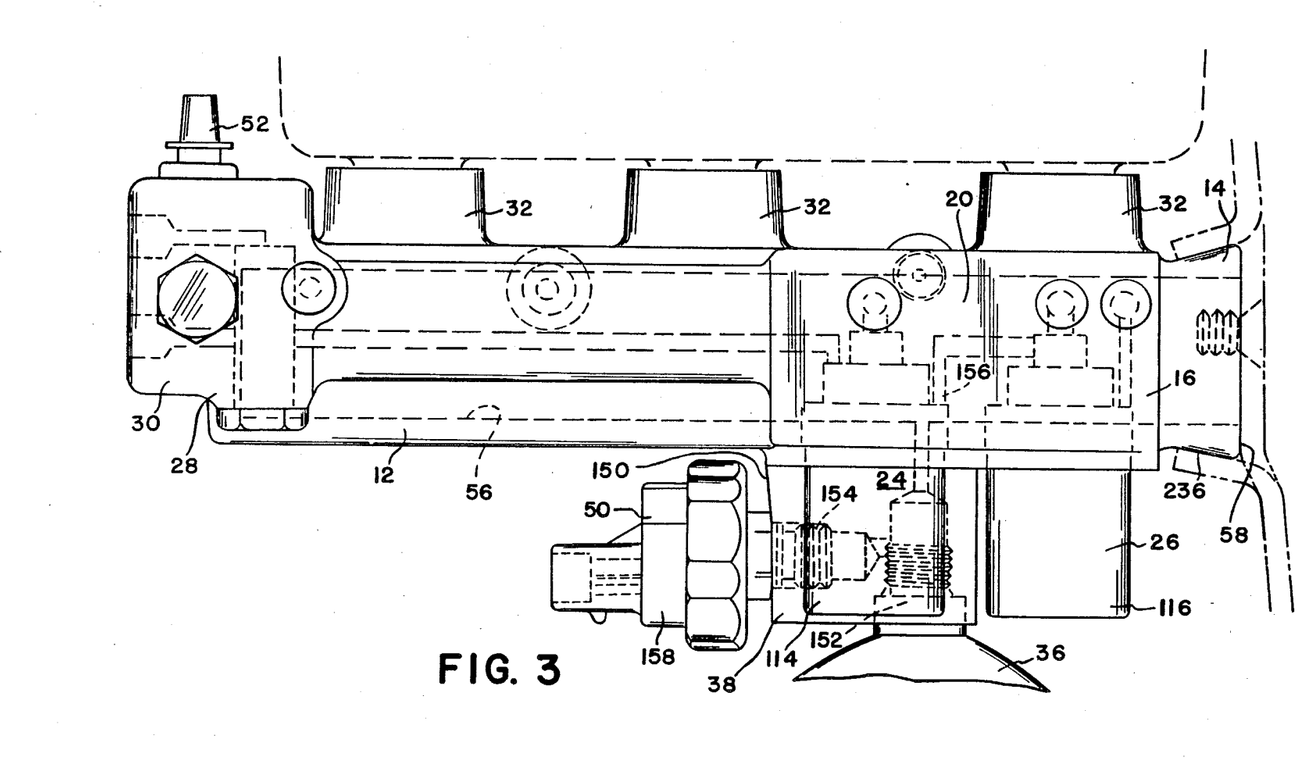
FIGS. 3, 4, and 5, are side, end, and top views of the body portion of the assembly with the fluid passages, receptacles, and chambers thereof shown in phantom.
Figure 4:
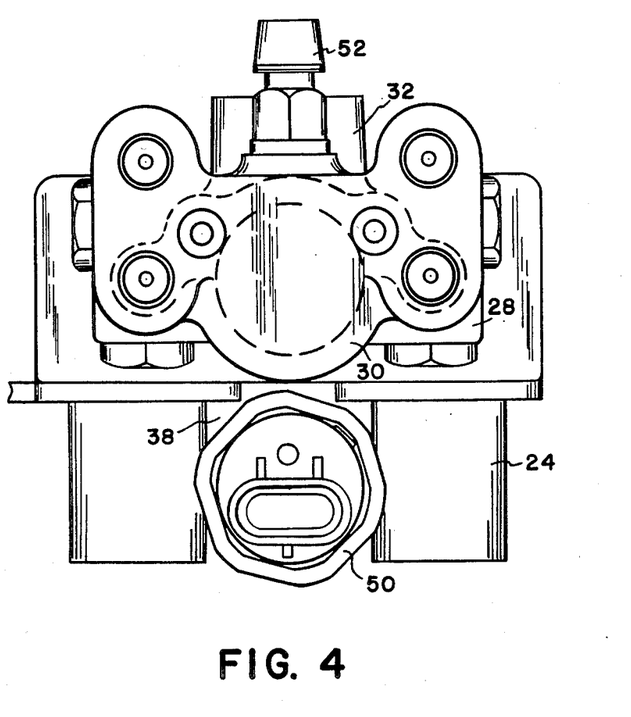
Figure 5:
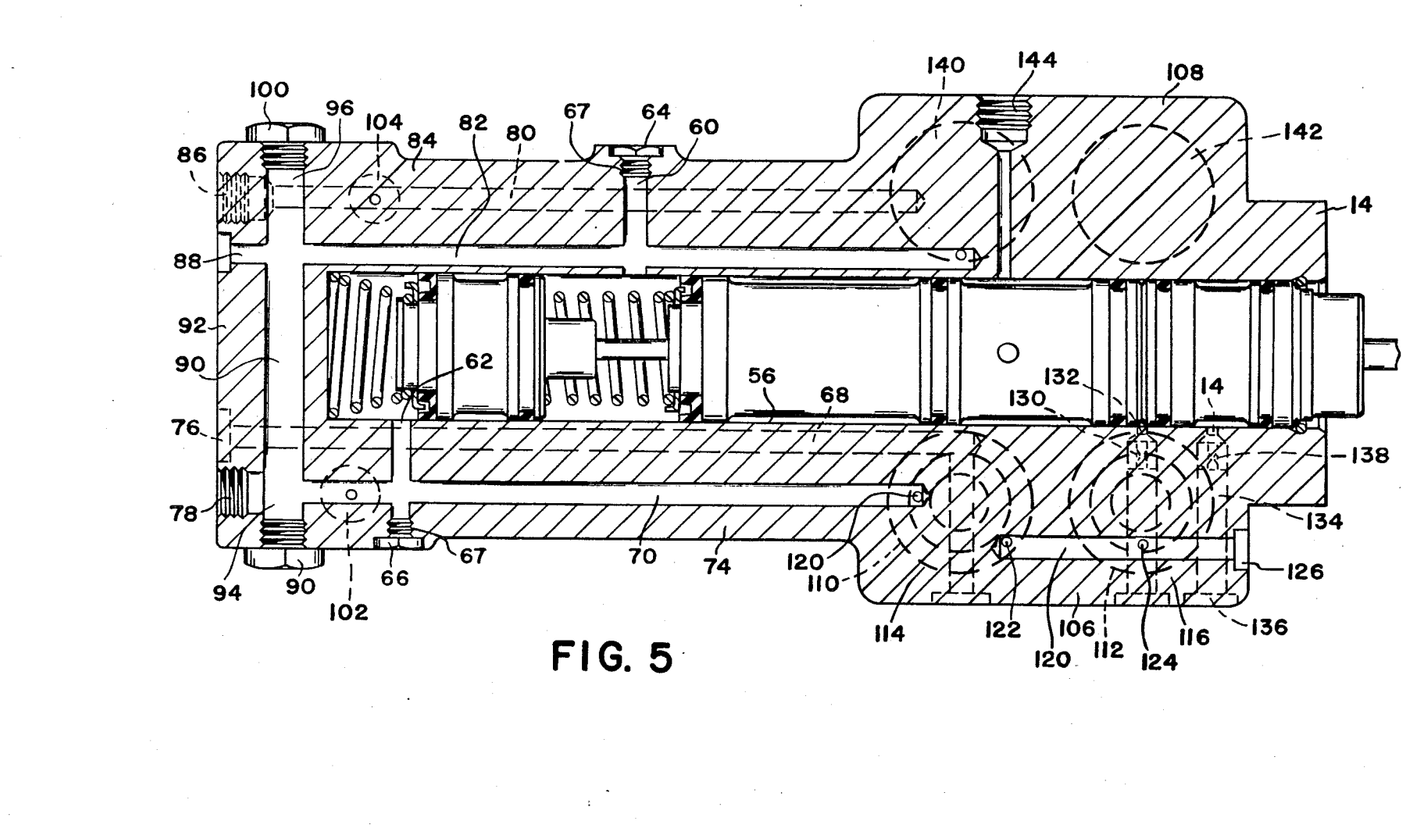

Referring now to FIGS. 3 through 5 inclusive, the body 12 is shown in greater detail. The body is preferably made of a single casting. An elongated cylindrical bore 56 is formed therein, the bore 56 extending substantially the length of the body 12 and being open at its end 58. A convention dual piston master cylinder and hydraulic booster assembly is operatively received within the bore 56. This assembly is of any type well known in the art. The master cylinder portion of the master cylinder hydraulic booster assembly provides two outputs which are communicated transversely outwardly from the bore 56 by means of fluid passages 60, 62. Passages 60, 62 are formed by means such as drilling and their ends 64, 66 closed by means such as threaded fasteners, pressed fitted plugs, or the like 67.

A first pair of fluid passages 68, 70 extend through the body 12 in parallel, spaced-apart relationship to the bore 56. These passages are arranged in laterally disposed, longitudinally extending flange portion 74 and are open at ends 76, 78 thereof distal mounting portion 14.

A second pair of fluid passages 80, 82 similarly extend through the body 12 and parallel, spaced-apart relationship to the bore 56. These passages are arranged in laterally disposed, longitudinally extending flange portion 84 and are open at ends 86, 88. A cylindrical differential pressure switch cavity 90 extends laterally through the body 12 in portion 92, cavity 90 communicating with the ends 78, 88 of passages 70 and 80. The outwardly disposed ends 94, 96 of cavity 90 are closed with threaded plugs 98, 100, respectively and a differential pressure switch assembly, described in detail below, is disposed in the central portion thereof.

Left and right proportioning valve receiving cavities 102, 104 are formed vertically in body portion 92, cavities 102, 104 being opened at their bottom ends (as viewed in the drawing) and the cavities communicate between the first and second fluid passage pairs 68, 70 and 80, 82 respectively. A proportioning valve assembly, described in detail below, is disposed within each of the cavities 102, 104.

Flanges 74, 80 are provided with enlarged modulating valve mounting portions 106, 108 adjacent body mounting portion 14. Stepped cylindrical recesses 110, 112 are formed in portion 106, recesses 110, 112 being opened at their bottoms (as viewed in the drawings) and at being direction to receive solenoid actuated isolation and build/decay valves 114, 116, respectively. Isolation valve assembly 114 and build/decay valve assembly 116 are described in detail below. A laterally extending fluid passage 118 provides fluid communication between cavity 110 and fluid passage 68. A fluid passage 120 provides a fluid communication between fluid passages 70 and cavity 110.

A longitudinally extending fluid passage 120 extends longitudinally from the rear of portion 106, 120 communicating with cavities 110, 112 by means of drill hole passages 122, 124, respectively. The open end 126 of passage 120 is closed by suitable plug. Passage 124 fluidly communicates through a selectively changeable orifice 130 with the boost chamber of the boost assembly via a fluid passage 132 and cavity 112 communicates with the reservoir 34 by means of a laterally extending fluid passage 134, closed by plug 136, a selectively changeable orifice 138, and a fluid passage 140. Portion 108 is substantially identical and provides communication with an isolation valve assembly 140 and a build-/decay valve assembly 142. A fluid passage 144 extends laterally through the portion 108 and provides fluid communication from the output conduit 46 of the pump 42 and the boost chamber. With specific reference to FIGS. 3 and 4, it is also provided a downwardly depending body portion 150 disposed centrally between the isolation valve assemblies 114, 140. A first fluid passage 152 extends upwardly through the portion 150 and is orthogonally intersected by a forwardly extending fluid passage 154. Passages 152, 154 communicate via a fluid passage 156 with the boost pressure inlet passage 130. Passage 154 receives a conventional pressure switch 158, switch 158 providing an indication of adequate boost pressure for the anti-lock braking system.

Figure 6:
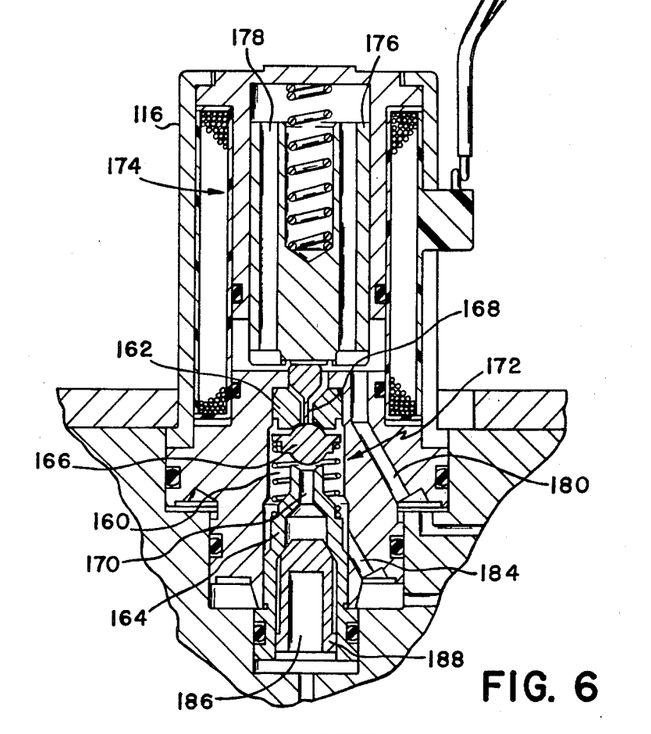
FIG. 6 is an axial sectional view of a typical solenoid actuated modulating valve for use in the invention.

Referring now to FIG. 6, there is shown an actual section a typical 3-way solenoid actuated valve suitable for use as the build/decay 116. This valve is provided with a central valve chamber 160 having a first valve seat 162 at its lower (as viewed in the drawings) end and a second valve seat 164 fixedly secured is spaced-apart relationship thereto. Generally spherical valve element 166 is disposed between end reciprocal between the valve seat 162, 164 to alternatively close one or the other of fluid passages 168 and 170, respectively. Valve element 166 is normally maintained in engagement with valve seat 162 by a suitable spring 172 and is selectively moved into engagement with the valve seat 164 by operation of a solenoid 174. Preferably, solenoid 174 includes a plunger 176 having actually extending bores 178 such that pressurized fluid will act equally at the opposite ends thereof to pressure balance same.

Fluid passage 134 communicates with a valve return fluid passage 180 which in turn communicates with the valve fluid passage 168. Fluid passage 124 communicates directly with a valve build inlet passage 184 which in turn communicates with the chamber 160. A valve inlet port 1986 fitted with a suitable filter 188 communicates directly with fluid passage 131. When the valve element 166 is in its normal illustrated position, fluid communication is provided between fluid passage 184 and 186. When valve element 166 is moved into engagement with valve seat 164, passage 186 is closed and fluid communication is established between passages 180 and 184. A similar valve arrangement provides a 3-way isolation valve suitable for use isolation valve 114. A typical hydraulical schematic is shown in FIG. 9. Under normal braking operation, the master cylinder communicates via passage 62 and 70 with the isolation valve 114 which normally connects the master cylinder to the brakes via a suitable conduit 190. Upon actuation of the anti-lock braking system, isolation valve 114 operates to close communication between the master cylinder and conduit 190 and establishes communication between conduit 190 and fluid passage 120. Under the control of a suitable control unit, valve 116 is alternately operated between a build and a decay state in which conduit 190 and, accordingly, the brakes of the vehicle, are connected to the boost chamber or to return or fluid reservoir 34. The construction and hydraulic connection of isolation and build/decay valves 140, 142 is substantially identical.

Figure 7:
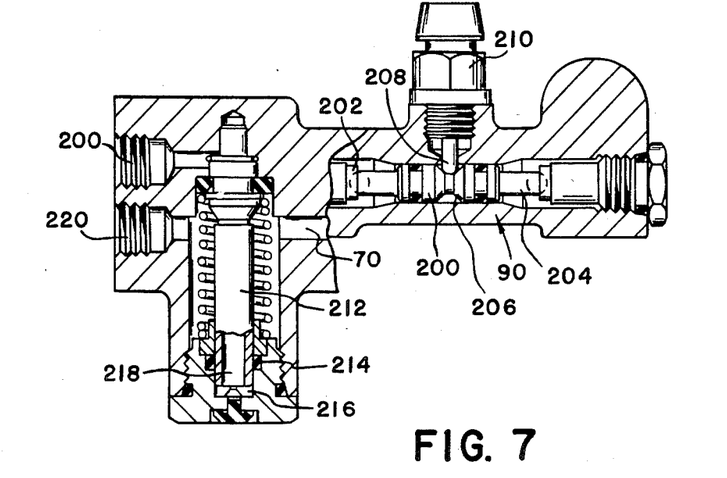
FIG. 7 is an axial sectional view showing details of a differential pressure valve and proportioning valves for use in the invention.

Referring now to FIG. 7, there shown a typical construction of a suitable differential pressure valve assembly 90. Assembly 190 includes a spool element 200 slidably reciprocally received in the bore 90 and is normally maintained in a neutral or centered position as illustrated by suitable springs 202, 204. A circumferential recess 206 is formed in the spool 200. The operating pin 208 of a conventional switch assembly 210 is operatively engaged in the recess 206 such that the switch 210 will operate in response to movement of the spool 200 in either direction this, in turn, resulting from a differential pressure existing between the output brake pressures in fluid passage 70 and 80. Lastly, a conventional proportioning valve assembly is disposed in each of the cavities 102 and 104. Proportioning valves include a plunger 212 maintained in an upwardly disposed position by a spring 214. A fluid passage 70 communicates through the cavity 102, passed a valve seat 216 and an actual bore 218 in the plunger 212 to communicate with a rear brake outlet port 220. In conventional manner, the output pressure to different brakes via outlet port 222 is applied simultaneously to the rear brakes via port 220 until a predetermined minimum pressure or kneepoint at which time the plunger operates in response to pressure to restrict brake pressure applied to the rear brakes 220 and thereby "proportion" the application of pressure between the front and rear brakes.

The entire assembly is mounted to the firewall of a vehicle by means of a universal mounting bracket 230 which includes a plainer mounting portion 232 having a plurality of mounting studs 234 fixedly secured thereto. Centrally of the plight 230 there is provided a reentrically walled recess 236 defined by a bent metal flange member 238. The reenterically flanged recess is complementary to mounting portion 14 such that the latter may be slidably inserted therein to mount the assembly 10 to a vehicle. It will be apparent that by simply modification of the member 238, assembly 10 can be mounted at different angles. Similarly, different mounting bolt patterns for bolts 234 can be affected easily to thereby adept the assembly for mounting in various vehicles.

It will now be seen that the novel anti-lock braking assembly above-disclosed provides a uniquely compact self-contained assembly. The assembly accommodates all of the essential elements of the anti-lock braking system including master cylinder, booster, differential pressure valve, pressure valves, accumulator, pump and the like. Substantially all of the hydraulic connections required for the systems operation are provided within a single casting and substantially all of these fluid passages are provided in the form of straight line fluid passages disposed parallel or orthogonal to the access of the master cylinder assembly such that all can be readily fabricated realizing conventional and straightforward machining techniques. This assembly is relatively small and occupies a space substantially the same of a conventional vacuum boosted master cylinder. The novel mounting portion and mounting assembly provide virtually universal mounting capability of standardized assembly 10.

Although the present invention has been illustrated and described in connection with example embodiments, it will be understood that this is illustrative of the invention, and is by no means restrictive, thereof. It is reasonable to be expected that those skilled in the art can make numerous revisions and additions to the invention and it is intended that such revisions and additions will be included in the scope of the following claims as equivalents of the invention.

What I claim is:

1. An integrated anti-lock braking system assembly comprising: an elongated body having a mounting end and an axial bore extending from said mounting end, a master cylinder assembly operatively disposed in said bore, said mounting end including a modulator valve mounting pad having a plurality of modulator valve receptacles therein, the distal end of said body including a valve block having a plurality of valve chambers and an outlet port for each vehicle wheel cylinder therein, brake pressure proportioning valve means and differential pressure valve means being operatively received in corresponding valve chambers, a plurality of primary fluid passages in said body extending in parallel spaced type relationship to said bore, a plurality of secondary fluid passages formed in said body on axes perpendicular to said primary fluid passages to intersect a corresponding one of said bore, primary fluid passages, modulator valve receptacles and valve chambers, to define an anti-lock braking system hydraulic circuit.

2. The assembly of claim 1 wherein said mounting end includes a bracket engaging portion extending outwardly therefrom and having three-entrantly angled spaced surfaces, and further including a mounting bracket having a mounting receptacle complementary to said bracket engaging portion and a mounting plate portion said receptacle portion and said mounting plate portions being disposed at predetermined selected angles to accommodate mounting assembly at selected angles.

3. The assembly of claim 2 wherein said bracket engaging portion is laterally slidably engagable with said receptacle portion and further including means for locking the bracket engaging portion in said receptacle portion.

4. The assembly of claim 1 wherein said secondary fluid passages extend into said body from the outer surface thereof.

5. The assembly of claim 4 wherein said bore, said primary fluid passages and said secondary fluid passages are disposed in orthogonal relationship.

6. The assembly of claim 1 wherein the axes of said outlet ports are disposed parallel, spaced-apart relationship to the axis of said bore, said valve chambers including a differential valve chamber extending orthogonal to an intersecting first pair of said primary fluid passages, said differential pressure valve assembly being operatively received therein, and a pair of proportioning valve chambers communicating between adjacent ones of a front and a rear brake outlet port, there being a proportioning valve assembly disposed in each said proportioning valve chamber.

7. The assembly of claim 1 wherein including modulator valve receptacle for each modulator valve of said anti-lock braking system.

8. The assembly of claim 7 wherein said anti-lock braking system includes a plurality of channels said modulator valves including an isolation valve and a pressure modulating valve for each said channel.

9. The assembly of claim 8 wherein said anti-lock braking system includes a primary and a secondary braking circuit, said master cylinder assembly including a primary and a secondary hydraulically isolated braking system circuit, said primary fluid passages including a passage extending from each said master cylinder circuit to the said isolation valves of said circuit and a pair of primary fluid passages for communicating fluid from respective ones of said pressure modulating valves to respective ones of said outlet ports of said circuit.

10. The assembly of claim 9 further including a flow control orifice disposed in each said isolation valve and modulating valve receptacle secondary fluid passage.

11. The assembly of claim 10 wherein said primary and secondary fluid passages are formed in substantially symmetrical arrays on opposite side of said body.

12. The assembly of claim 11 further including mounting pad means for mounting a fluid reservoir to said body and including reservoir passages therein for communicating fluid from said reservoir to said master cylinder assembly.

13. The assembly of claim 12 further including a pump mounting bracket fixedly secured to said body, a pump assembly mounted to said bracket, a braking fluid pressure feed line extending from said fluid pump to a said secondary fluid passage, there being a said secondary fluid passage communicating from said feed line to each said master cylinder chamber, and a fluid return line extending from said pump to said reservoir, there being a said secondary fluid passage extending from said anti-lock braking circuit pressure regulating valves to said pump assembly for returning braking fluid released from said braking circuits by said anti-lock braking system pressure regulating valve.

14. The assembly of claim 13 further including a pressure switch mounted to said receptacle portion and further including a said secondary fluid passage communicating between said switch and the output of said pump.

15. The assembly of claim 14 further including an accumulator receptacle formed in said receptacle portion adjacent said modulator receptacles and there being a said secondary fluid passage communicating from said accumulator to respective input of said modulator valves.

* * * * *